United States Patent
Trupp et al.

[15] 3,653,611
[45] Apr. 4, 1972

[54] SLOTTED DELTA WING AIRCRAFT

[72] Inventors: Mason Trupp; Granbyrne Garrison Trupp, both of 310 Blanca Lane, Tampa, Fla. 33606

[22] Filed: Mar. 24, 1970

[21] Appl. No.: 22,214

[52] U.S. Cl. ..................................................244/48
[51] Int. Cl. ..............................................B64c 3/38
[58] Field of Search ...............................244/46, 48

[56] References Cited

UNITED STATES PATENTS

| 3,147,938 | 9/1964 | Danner | 244/48 |
| 2,985,408 | 5/1961 | Johnson | 244/48 |
| 2,953,322 | 9/1960 | Lewis | 244/46 |
| 3,190,583 | 6/1965 | Stoppe | 244/48 |

FOREIGN PATENTS OR APPLICATIONS

| 935,656 | 9/1963 | Great Britain | 244/46 |

Primary Examiner—Milton Buchler
Assistant Examiner—Carl A. Rutledge
Attorney—Sherman Levy

[57] ABSTRACT

A slotted delta wing aircraft wherein there is provided a delta wing air frame member that is attached axially by its trailing edge to the rear of the fuselage of the aircraft, and wherein this construction permits vertical and short take-offs as well as increased acrobatic maneuverability, and wherein ingestion of hot gases by propulsion units is prevented.

3 Claims, 6 Drawing Figures

PATENTED APR 4 1972          3,653,611
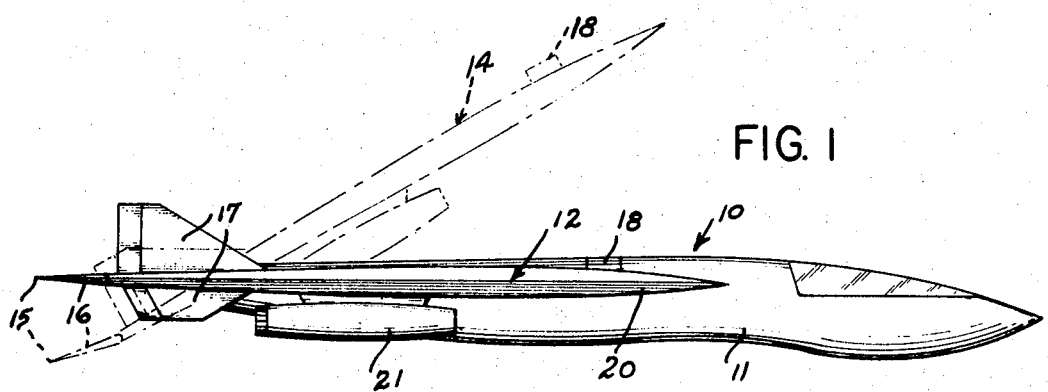
FIG. 1
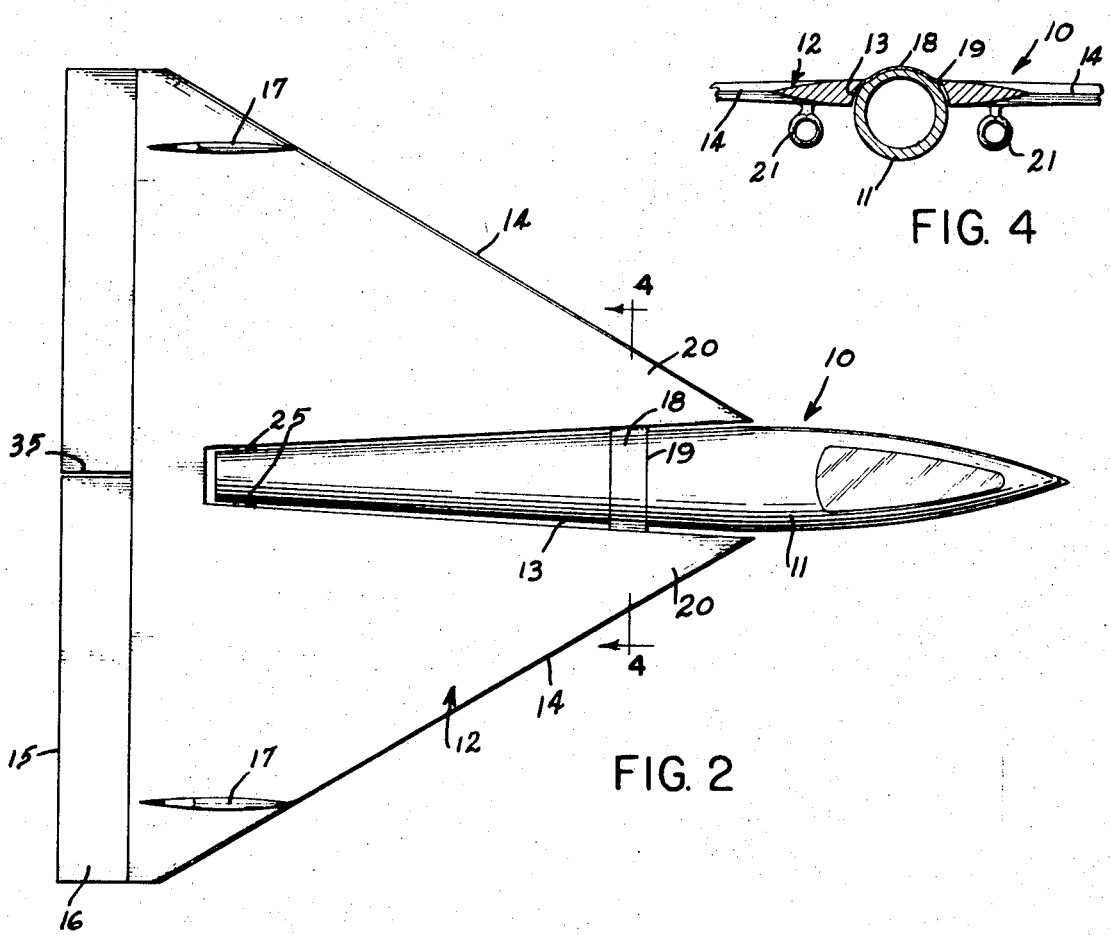
FIG. 4
FIG. 2
INVENTORS
**MASON TRUPP
GRANBYRNE G. TRUPP**
BY *Sherman Levy*
ATTORNEY

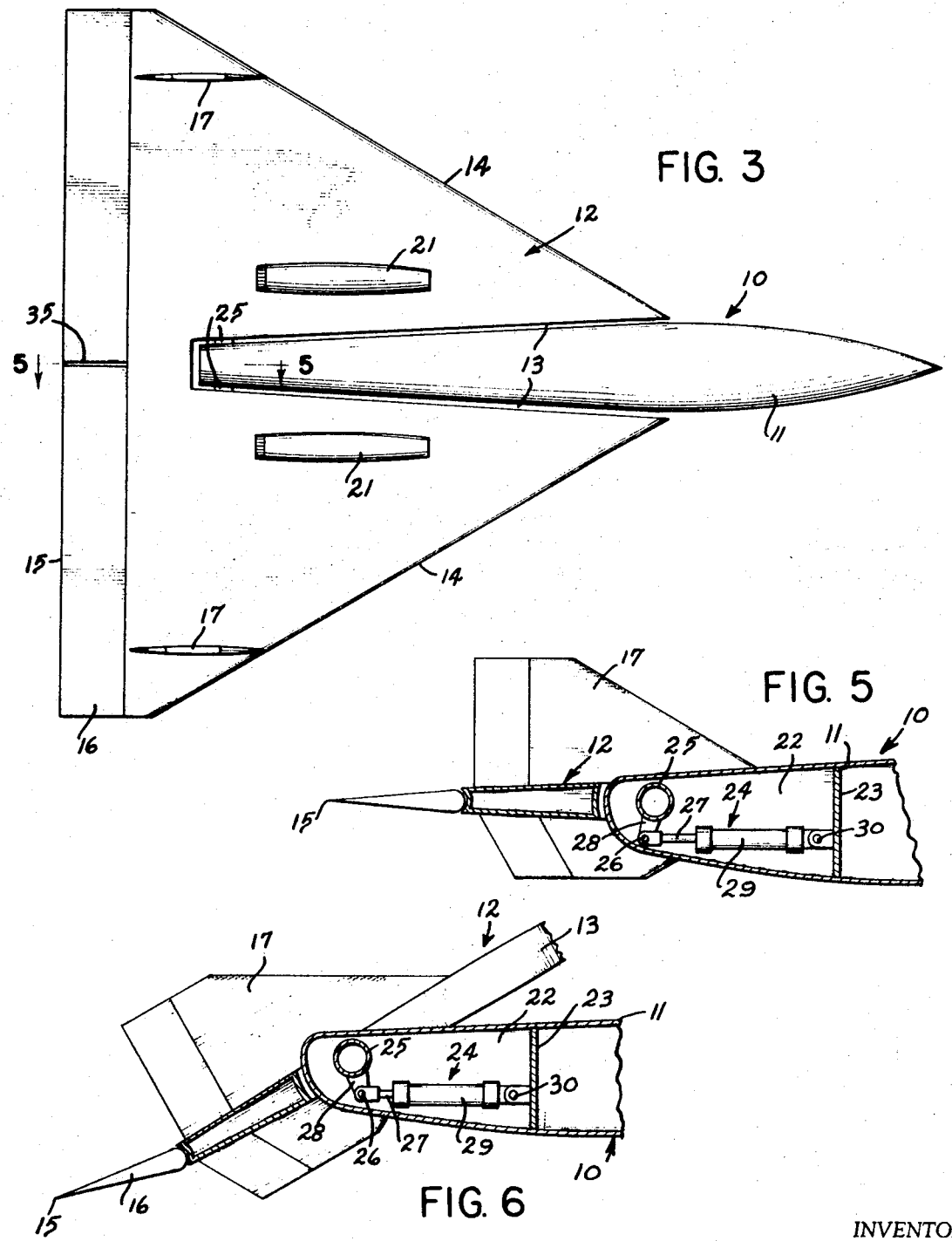

SLOTTED DELTA WING AIRCRAFT

This invention relates to an aircraft, and more particularly to a hummingbird slotted delta wing anti-hot air ingestion aircraft.

An object of the present invention is to provide a slotted delta wing aircraft that is especially suitable for vertical and short take-off.

Another object of the present invention is to prevent hot gas ingestion by separating the engine intake inlets by the perimetric conformation of the delta wing, and wherein in accordance with the present invention there is provided a tiltable delta wing.

Still another object is to provide a slotted delta wing anti-hot air ingestion device for aircraft that is rugged in structure and efficient in operation or use.

These and other objects of the invention will become apparent from a reading of the following specification and claims, together with the accompanying drawing, wherein like parts are referred to and indicated by like reference characters, and wherein:

FIG. 1 is a side elevational view of the slotted delta wing aircraft, showing one application of the present invention.

FIG. 2 is a top plan view thereof.

FIG. 3 is a bottom plan view thereof.

FIG. 4 is a sectional view taken on the line 4—4 of FIG. 3.

FIG. 5 is an enlarged sectional view taken on the line 5—5 of FIG. 3.

FIG. 6 is a fragmentary sectional view similar to FIG. 5, showing the parts in a different or adjusted position.

Referring in detail to the drawings, the numeral 10 indicates the slotted delta wing aircraft of the present invention, which includes a fuselage 11 as well as a delta wing 12, and the wing 12 has a slot 13 therein for receiving a portion of the fuselage 11, as shown in the drawings. The wing 12 includes angularly arranged side edges 14 as well as a straight rear edge 15, and a trailing edge elevator 16 may be provided on the rear portion of the wing 12. The wing 12 further includes or is provided with vertical stabilizers 17 adjacent the outer rear portions thereof. One or more straps or cross pieces 18 extend between the front sections or portions 20 of the wing 12, and the cross pieces 18 may be received in recessed portions 19 on the fuselage 11 when the wing 12 is in the solid line position shown in FIG. 1. Propulsion units such as jet engines may be suitably affixed to the delta wing 12, and the propulsion units 21 may be of conventional construction.

Means are provided for tilting or pivoting the delta wing 12, and this means may be arranged in a suitable compartment 22 that is partially defined by a partition 23 in the rear of the fuselage 11, FIGS. 5 and 6. For this purpose, a cylinder 29 may be provided which can be actuated by hydraulic fluid, air under pressure, or the like, and the cylinder 29 is adapted to be used for reciprocating or moving a piston rod 27 that is connected as at 26 to a linkage arrangement 28 and the linkage 28 may be fixed to a rotary shaft 25. The shaft 25 extends through the rear portion of the fuselage 11 and is suitably affixed to adjacent portions of the wing 12 so that as the cylinder 24 is is energized or actuated, the wing structure 12 will be tilted or pivoted about an axis extending through the rod or shaft 25.

Actuating cylinder 29 of the tilting means 24 may be secured in place by any suitable means, as for example, the cylinder 29 may be affixed to the partition 23 as at 30.

From the foregoing, it will be seen that there has been provided a slotted delta wing aircraft, and in use, with the parts arranged as shown in the drawings, the aircraft 10 may be propelled or driven by engines or propulsion units 21 which may be of conventional construction, and for example, these parts may be similar to those shown in prior U.S. Pat. Nos. 3,250,495, 3,250,496, 3,323,759 and 3,484,460.

When it is desired to tilt the wing 12, it is only necessary to actuate the power mechanism 24 whereby the cylinder 29 can be suitably actuated so as to extend or retract the rod 27, and since the rod 27 is connected to the linkage 28 as at 26, it will be seen that this movement of the rod 27 will result in corresponding rotation of the shaft 25. Since the shaft 25 is suitably affixed to the delta wing 12, it will, therefore, be seen that the delta wing 12 will be tilted to a desired angle. Thus, the delta wing can be moved from the solid line position of FIG. 1 to the broken line position of FIG. 1, or vice versa, or the wing 12 can be positioned in an intermediate position or other adjusted position, as desired or required. Similarly, FIGS. 5 and 6 show the wing 12 in different positions. The parts can be made of any suitable material and in different shapes or sizes as desired or required.

It is to be understood that various types of controls and accessories can be used with the present invention, as needed or desired.

It will be seen that there has been provided a hummingbird slotted delta wing anti-hot air ingestion device wherein there is provided a delta wing air frame that is attached actually by its trailing edge to the rear of the fuselage, and whose conformation allows for vertical and short take-offs as well as increased acrobatic maneuverability and also prevents ingestion of hot gases by its propulsion units.

The present invention is directed to the field of aeronautics and also in particular to air frame design for vertical and short take-off.

Heretofore, prior aircraft or devices for short take-off and vertical lift have involved tilting wing aircraft of the non-delta type, fixed forward of the mid-fuselage distance. In addition, other devices have included shrouded propeller aircraft, and certain of the prior devices have included tilted propulsion units with wings fixed in the standard position. In fighter or combat aircraft, separate propulsion units are used for lift, while other units in the same system are used for cruise.

The present invention provides for a tiltable delta wing attached to the rear of the fuselage at the trailing edge of the wing, and for vertical rotation about the long axis of the aircraft fuselage and below the long axis of the fuselage in order to obtain characteristics of flight not heretofore or currently available from other aircraft systems.

With the present invention, there is provided the further advantage that hot gas ingestion is prevented by separating the engine intake inlets by the perimetric conformation of the delta wing. No other currently proposed tilt wing aircraft can offer this advantage against hot air ingestion and at the same time take advantage of the delta wing conformation for increased lift.

At the present time, the present state of the art of tilt wing aircraft is such that the loss of wing lifting surface to accomplish vertical take-off makes such sacrifices to obligatorily require the use of propeller lifting engines which substitute propeller airfoil characteristics for loss of lift surface resulting from vertically tilting the wing of conventional design.

In addition, the present invention can be used with non-propeller engines and may take advantage of the jet propulsion engine with its increased effectiveness to gain increased cruising speeds and yet not lose the advantage of increased wing loading tolerances which the delta wing provides, or compensates for.

In addition, a tiltable delta wing provides, in the manner described herein, an air-braking surface, which is especially advantageous for landing on naval aircraft carriers and on unprepared fields.

Also the ability to tilt the delta wing above the axial line of the fuselage and also below the axial line of the fuselage adds new dimensions to the tactical maneuvering of the craft for combat purposes. In addition, there is a particular advantage in its ability to close in on or to evade an opponent because of increased ability to climb and descend rapidly by taking advantage of air resistance to reduce or increase acceleration at an increased rate.

Thus, the present invention introduces a new range of acrobatics to the inventory of tactical maneuvering which can be identified as the humming bird movement or procedure for utilizing the same.

Also, the hummingbird delta wing refers to the ability of the delta surface to be raised above the central axial line of the fuselage from its normal cruise level at which time it appears to be pseudo-blended with the fuselage, but is, in fact, a slotted delta wing conformation, so that the wing may be rotated in-line, above or below, the central axial line of the fuselage in order to accomplish the proposed advantages of the slotted delta wing.

It will, therefore, be seen that there has been provided a delta wing air frame whose wing is attached actually by its trailing edge to the rear of the fuselage, and whose conformation allows tilting of the delta wing above and below the central axial line of the fuselage for short and vertical take-off. This construction provides for increased tactical acrobatic maneuvering of the craft in combat and for shipboard landings. The present invention assures efficient vertical and short take-off and use of the perimetric conformation of the craft to prevent hot gas ingestion. This construction also makes use of a new slotted delta wing. This aircraft can carry missiles and the like that may be stowed under the body structure on any suitable or conventional manner.

If desired, cross members such as the members 18 may join each portion 20 of the wing across the slot 13 to reinforce the wing at its slotted section, so that if desired an additional engine could be placed above and supported by the cross members, which cross members blend into the conformation of the fuselage and contribute additional structural support of the hummingbird wing.

In addition, a further capability of the hummingbird design is that the length of the leading edge of the wing is increased so as to increase the lift capacity. A further capability of the wing is to offer additional gun sighting from the fuselage and wing in separate directions.

Also a further capability of the hummingbird slotted wing is the capacity for stowing some missiles under the wing surface, while others can be stowed alongside the fuselage of the craft and this will allow multiple points of aiming of missiles and can be used to establish a further margin of capability when occasionally large numbers of aircraft are destroyed by attacking craft before they can become airborne. This will yield an advantage which may in some areas reduce the number of planes required for airborne alert. Also ground to air missiles on the hummingbird wing could be discharged by remote control if desired or required.

If desired, a canard delta may be attached in the forward section of the fuselage to improve control and increase lift at near cockpit location.

The trailing edge of the delta wing may have a substantial member which attaches it to the craft, similar to an axle or pin or pinion in a hinge, to reinforce the entire trailing edge of the wing to the fuselage member. The vertical stabilizers 17 extend below as well as above the surface of the wing, as shown in the drawing. The vertical stabilizers may be in a lateral position or in a para-fuselage position adjacent to the fuselage structure, but in each case both the stabilizers 17 are above and below the wing.

The positioning of the hummingbird delta wing in its take-off and landing attitude is accomplished in any suitable or conventional manner. Thus, a gear mechanism comprising a threaded spindle rotatable by power means and carrying thereon a swivel nut attached to a hinged pinion and rearward of which are attached the ailerons and wing flaps of standard prior designs may be used, and which are not a part of the present invention. Also, a canard wing of standard design may be attached forward to the fuselage and may be used, and this is also not a part of the present invention.

The slotted section of the hummingbird wing is parallel to the long axis of the fuselage but not transverse as in prior slot wing designs. The present invention can be used on various types of aircraft such as fighter aircraft. As shown in the drawings, the hummingbird wing may be arranged in a take-off position with the wing tilted upward and missiles may be attached both to the fuselage and to the wing, so that this can provide a new type of bomber technology. The extension of the vertical stabilizers below as well as above the wing is important to control of the delta wing in the landing and take-off positions.

Also, as shown in the drawings, the elevator on the delta wing is adapted to be divided by line 35 so as to indicate that in addition to its function as an elevator, it may also function as an airelon to provide for turning the craft. This line is shown in FIGS. 2 and 3.

The delta wing craft provides a launching platform for ground to air missiles while the craft is parked.

While an illustrative embodiment of the invention is shown and described in considerable detail herein, it should be understood that the invention is not limited thereto, but embraces all modifications and variations which fall within the scope of the claims appended hereto.

We claim

1. In an aircraft, a fuselage, a hummingbird delta wing having a slot therein parallel to the longitudinal axis of the fuselage, said slot adapted to receive therein a portion of the fuselage, said wing having angularly arranged side edges and a straight rear edge, a trailing edge elevator on said wing, vertical stabilizers on said wing adjacent the outer side portions thereof, and said stabilizers projecting above and below the wing surface, at least one strap extending between the opposed sections of the wing, propulsion means affixed to said aircraft, and means for pivoting said wing, said last named means comprising a shaft mounted in the rear portion of the fuselage, said shaft being affixed to the adjacent portions of the wing, and means for rotating said shaft.

2. In an aircraft, a fuselage, a hummingbird delta wing having a slot therein, said slot adapted to receive therein a portion of the fuselage, said wing having side edges and a rear edge, a trailing edge elevator on said wing, stabilizers on said wing adjacent the outer side portions thereof, at least one strap extending between the opposed sections of the wing, propulsion means affixed to said aircraft, and means for pivoting said wing, said last named means comprising a shaft mounted in the fuselage, said shaft being affixed to the adjacent portions of the wing, and means for rotating said shaft.

3. In an aircraft, a fuselage, a hummingbird delta wing having a slot therein, said slot adapted to receive therein a portion of the fuselage, said wing having side edges and a rear edge, a trailing edge elevator on said wing, stabilizers on said wing adjacent the outer portions thereof, at least one strap extending between the opposed sections of the wing, the straps designed long enough to allow for negative angles of incidence, propulsion means affixed to said aircraft, and means for pivoting said wing, said last named means comprising a shaft mounted in the fuselage, said shaft being affixed to the adjacent portions of the wing, and means for rotating said shaft to produce positive and negative angles of incidence.

* * * * *